Nov. 15, 1938.  E. WITZENMANN  2,136,770
FLEXIBLE CONDUIT
Filed March 2, 1936  2 Sheets—Sheet 1

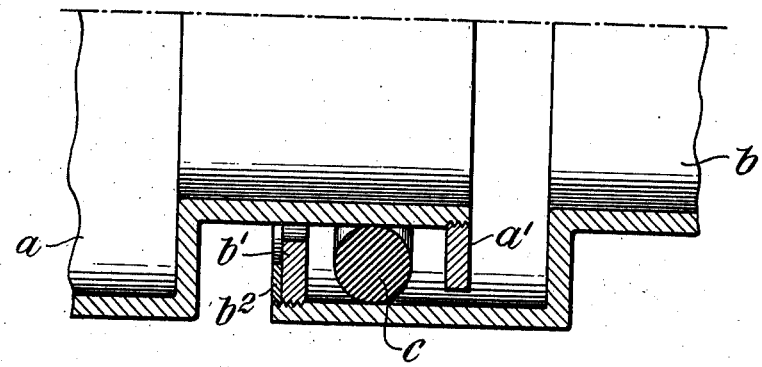
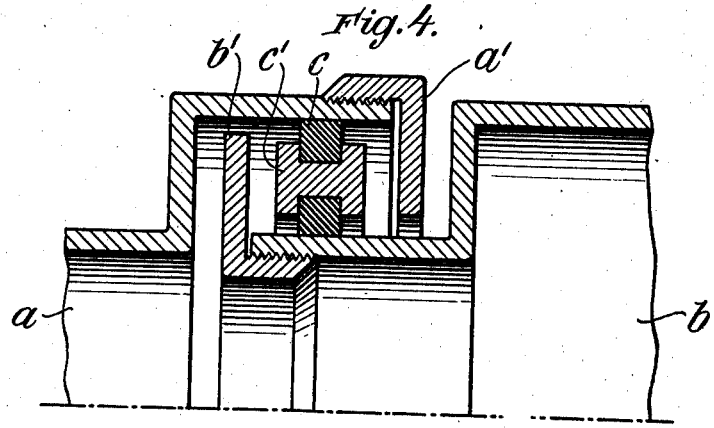
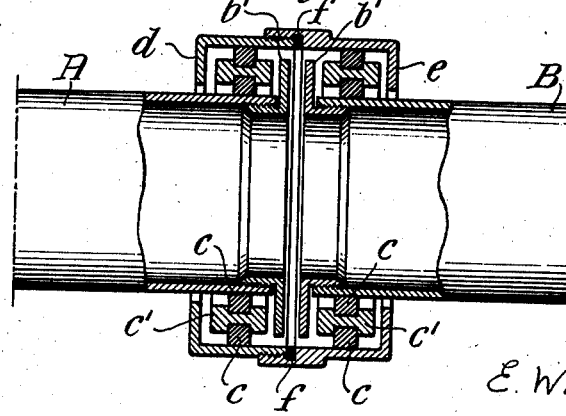

Patented Nov. 15, 1938

2,136,770

UNITED STATES PATENT OFFICE 2,136,770

FLEXIBLE CONDUIT

Emil Witzenmann, Pforzheim, Germany

Application March 2, 1936, Serial No. 66,757
In Germany February 26, 1935

1 Claim. (Cl. 138—50)

This invention relates to a flexible pipe, i. e. a conduit movable in every direction, which may be employed with equal advantage for conveying steam, gas, compressed air or liquid, and is particularly suitable for use as a compressed air conduit for the air brakes of railway carriages.

In the known flexible pipes made of helically wound metal strip, the packing members are inaccessible, with the result that when even a single turn of the packing ruptures or perishes, the whole pipe has to be discarded.

An object of the invention is to provide a flexible pipe the packing of which is easily accessible in order that said packing may be easily and quickly renewed as and when required.

Another object of the invention is to provide a flexible conduit comprising a plurality of tubular members fitted together with interposed renewable packing.

Broadly, a flexible conduit according to the invention comprises a plurality of tubular members such as preferably short lengths of pipe fitted together as by overlapping flange members with interposed packing in such manner as to permit their relative flexure.

In the simplest form of the invention, flange members are screwed on or in the ends of the lengths of pipe.

It is possible to arrange the aforesaid packing members, in some embodiments, in such a way as to provide complete sealing for the medium passing through the conduit, so that no separate packings are required at the points of attachment of the flange members, e. g., where the flange members are screwed to the lengths of pipe.

Various embodiments of flexible conduits according to the invention are illustrated by way of example in the accompanying drawings, wherein:—

Figs. 3 to 5 are fragmentary axial sectional views of further embodiments.

Figure 1:
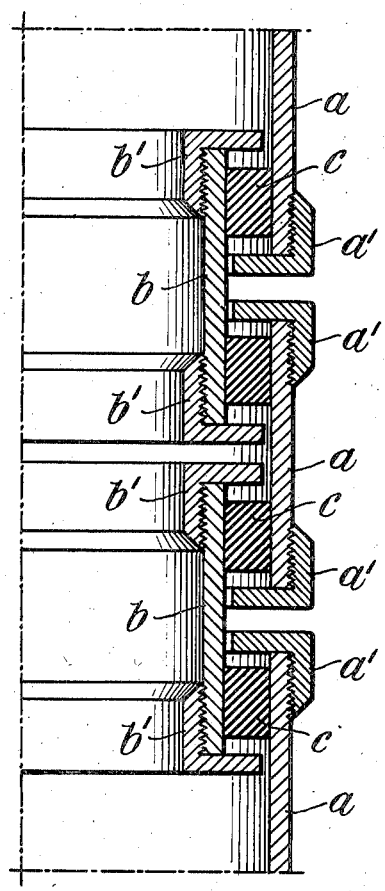
Fig. 1 is a fragmentary axial sectional view of one form.
Figure 2:
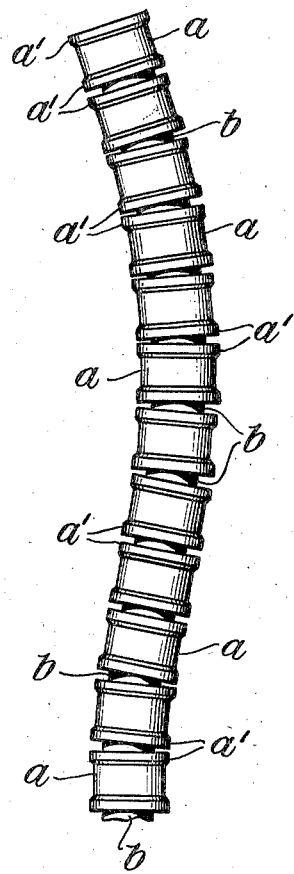
Fig. 2 shows a length of flexible conduit according to Fig. 1 in elevation, on a smaller scale.

Referring to Figs. 1 and 2, adjacent ends of tubular members constituted by overlapping lengths of pipe $a$ of larger diameter and $b$ of smaller diameter are provided with flange members $a'$ and $b'$ respectively, the flange member $a'$ at each joint being screwed on the end of the length of pipe $a$ and the flange member $b'$ being screwed into the end of the length of pipe $b$.

As will be seen in the drawings, the flange members $a'$ and $b'$ at the adjacent ends of the lengths of pipes overlap radially, so that a packing member $c$ inserted between the flange members $a'$ and $b'$ is encased on all sides between said flange members and the longitudinally overlapping end portions of said lengths of pipe, as in the case of flexible pipes constructed of helically wound metal strip.

It will also be seen that separate packing means at the points where the flange members are screwed to the lengths of pipe is not required, because the packing members $c$ provide an adequate seal for preventing the issue of the medium flowing in the conduit.

The flange members $a'$, $b'$ also serve as abutments for limiting the relative movement of the members when the pipe is exposed to tensional, compressional or flexing stresses.

To gain access to any packing member $c$ the enclosing couple of lengths of pipe $a$ and $b$ are relatively displaced by axial sliding and the flange member $a'$ is unscrewed. The lengths of pipe are then pulled apart and upon removal of the flange member $b'$ the packing member $c$ may be renewed. Member $b'$ is then screwed back in position, the length of pipe $a$ is pushed over the fresh packing and member $a'$ is screwed fast. Obviously, the packing member $c$ is of such size relative to the inner diameter of $a$ and the outer diameter of $b$ that the packing $c$ is initially compressed when the members are assembled, such compression—as is known from the instance of flexible tubes made of metal spirals—being quite sufficient for providing an adequate seal even at the highest pressures occurring in practice inside the pipe.

Referring to Fig. 3, $a$ and $b$ are adjacent, similar, stepped tubular members, the larger end of the member $b$ overlapping the smaller end of the member $a$. A flange member $a'$ is screwed on the smaller end of $a$, a flange member $b'$ is screwed within the larger end of $b$, and a packing member $c$ is interposed between said ends. As a safety measure, the member $b'$ may be secured against becoming loose owing to vibration by means of a locking ring $b^2$.

Fig. 4 shows an embodiment similar to that shown in Fig. 3, but having two ring packings $c$ embedded in grooves in a metal ring $c'$. The object of this arrangement is to ensure the correct position of the packing $c$ when very high pressures occur, the ring $c'$ preventing excessive axial movement of the packing by abutting either against flange member $a'$ or flange member $b'$, as the case may be.

In the forms shown in Figs. 3 and 4, separate packing at the screw threads may be dispensed with, as in the form shown in Fig. 1.

Fig. 5 shows two joints wherein the tubular members of smaller diameter are constituted by lengths of pipe A and B having flange members $b'$, $b'$ screwed into their adjacent ends, whereon packing members $c$ embedded in grooved metal rings $c'$ are seated. The intermediate larger tubular member serving to complete said two joints is constituted by a sleeve comprising two co-operating, threaded rings $d$, $e$, which are provided with integral flanges radially overlapping the flange members $b'$ of the lengths of pipe A, B, so that the packing of each joint is disposed in the annulus defined by the flanged ring $d$ or $e$, and the end portion of the length of pipe A or B with its flange member $b'$. To gain access to the packings, the two parts of the sleeve are separated and the flange members $b'$ are unscrewed, whereupon the packings may be renewed. Upon assembly in the reverse order the conduit is again ready for use. In this case an auxiliary packing member $f$ is required at the point where the sleeve parts $d$ and $e$ are screwed together, in order that the conduit may be adequately sealed against the issue of the medium flowing therein.

Evidently the invention may include variations other than those herein described and illustrated, without exceeding the scope of the appended claim.

Flexible conduits according to the invention are distinguished by great simplicity and ease of manufacture in comparison, for example, with the known flexible pipes of the kind utilizing ball joints, which require precision work, as, for instance, grinding, in their manufacture.

I claim:

A flexible conduit comprising a plurality of tubular members jointed together, each joint consisting of a larger end portion of one member overlapping a smaller end portion of an adjacent member, radially overlapping flange members on said end portions, the flange member on each end member being spaced from the opposite end member to accommodate limited relative movement of the tubular members, a circumferential packing interposed between said end portions and confined between said flange members, the flange member on the larger end portion being detachable to facilitate renewal of the packing and said packing being freely movable bodily between said end portions and between said flange members.

EMIL WITZENMANN.